United States Patent
Kim et al.

(10) Patent No.: US 12,157,108 B2
(45) Date of Patent: Dec. 3, 2024

(54) METHOD FOR PREPARING SUPERABSORBENT POLYMER

(71) Applicant: LG Chem, Ltd., Seoul (KR)

(72) Inventors: Kyu Pal Kim, Daejeon (KR); Kyunghoon Min, Daejeon (KR); Gicheul Kim, Daejeon (KR); Yoon Jae Min, Daejeon (KR); Ki Hyun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 658 days.

(21) Appl. No.: 17/431,527

(22) PCT Filed: Nov. 5, 2020

(86) PCT No.: PCT/KR2020/015363
§ 371 (c)(1),
(2) Date: Aug. 17, 2021

(87) PCT Pub. No.: WO2021/091240
PCT Pub. Date: May 14, 2021

(65) Prior Publication Data
US 2022/0111351 A1 Apr. 14, 2022

(30) Foreign Application Priority Data

Nov. 5, 2019 (KR) .................. 10-2019-0140502
Nov. 4, 2020 (KR) .................. 10-2020-0146310

(51) Int. Cl.
| | | |
|---|---|---|
| B01J 20/26 | (2006.01) | |
| B01J 20/30 | (2006.01) | |
| C08F 2/01 | (2006.01) | |
| C08F 2/48 | (2006.01) | |
| C08F 220/06 | (2006.01) | |
| C08F 222/10 | (2006.01) | |
| C08J 3/24 | (2006.01) | |
| C08K 3/30 | (2006.01) | |
| C08K 3/36 | (2006.01) | |
| C08K 5/05 | (2006.01) | |
| C08K 5/053 | (2006.01) | |
| C08K 5/15 | (2006.01) | |
| C08K 5/1565 | (2006.01) | |

(52) U.S. Cl.
CPC .......... B01J 20/261 (2013.01); B01J 20/267 (2013.01); B01J 20/3021 (2013.01); B01J 20/3028 (2013.01); C08F 2/48 (2013.01); C08F 220/06 (2013.01); C08F 222/102 (2020.02); C08J 3/24 (2013.01); C08K 3/30 (2013.01); C08K 3/36 (2013.01); C08K 5/053 (2013.01); C08K 5/1565 (2013.01); B01J 2220/68 (2013.01); C08K 2003/3081 (2013.01)

(58) Field of Classification Search
None
See application file for complete search history.

(56) References Cited

U.S. PATENT DOCUMENTS

| | | | |
|---|---|---|---|
| 4,446,261 A | 5/1984 | Yamasaki et al. | |
| 5,369,148 A | 11/1994 | Takahashi et al. | |
| 6,150,469 A | 11/2000 | Harada et al. | |
| 2004/0181031 A1 | 9/2004 | Nogi et al. | |
| 2006/0183828 A1 | 8/2006 | Dairoku et al. | |
| 2007/0149760 A1 | 6/2007 | Kadonaga et al. | |
| 2009/0152371 A1 | 6/2009 | Stark et al. | |
| 2010/0062252 A1 | 3/2010 | Kimura et al. | |
| 2011/0237735 A1 | 9/2011 | Funk et al. | |
| 2014/0296465 A1 | 10/2014 | Sakamoto et al. | |
| 2014/0306156 A1 | 10/2014 | Tian et al. | |
| 2017/0050171 A1 | 2/2017 | Yang et al. | |
| 2017/0066862 A1 | 3/2017 | Matsumoto et al. | |
| 2017/0354952 A1 | 12/2017 | Kim et al. | |
| 2019/0105628 A1 | 4/2019 | Kotake et al. | |
| 2020/0316549 A1 | 10/2020 | Kotake et al. | |
| 2021/0179790 A1 | 6/2021 | Lee et al. | |

FOREIGN PATENT DOCUMENTS

| | | |
|---|---|---|
| CA | 2199480 A1 | 3/1996 |
| EP | 2399944 A1 | 12/2011 |
| EP | 3225649 A1 | 10/2017 |
| JP | S56161408 A | 12/1981 |
| JP | S57158209 A | 9/1982 |

(Continued)

OTHER PUBLICATIONS

International Search Report for Application No. PCT/KR2020/015363, mailing Feb. 18, 2021, 3 pages.
Odian, George, Principles of Polymerization, Second Edition, published 1981, p. 203, John Wiley & Sons, Inc.
Schwalm, Reinhold, "UV Coatings; Basics, Recent Developments and New Applications", Dec. 2006, p. 115, Elsevier Science.
Extended European Search Report including Written Opinion for Application No. 20885848.0, dated Feb. 23, 2022, pp. 1-11.

*Primary Examiner* — Daniel Berns
(74) *Attorney, Agent, or Firm* — Lerner David LLP

(57) ABSTRACT

A method for preparing superabsorbent polymer is disclosed herein. In some embodiments, a method includes polymerizing a monomer composition to form a hydrogel polymer, wherein the monomer composition comprises a water soluble ethylenically unsaturated monomer and a polymerization initiator, drying and grinding the hydrogel polymer to prepare a base resin powder, surface cross-linking the base resin powder using a surface cross-linking agent to prepare surface cross-linked base resin powder, and hydrating the surface cross-linked base resin powder by pulse spraying water to prepare a superabsorbent polymer, wherein a scattering index of droplets generated during the pulse spraying is 5 to 10, and wherein the scattering index is calculated in accordance with the following Mathematical Formula 1. The superabsorbent polymer can have an improved moisture content to prevent surface property change of the superabsorbent polymer, and decreased amount of fine powder which improves processability during manufacture of articles using superabsorbent polymer.

14 Claims, No Drawings

(56) References Cited

FOREIGN PATENT DOCUMENTS

| | | | |
|---|---|---|---|
| JP | S57198714 A | 12/1982 | |
| JP | H02193665 A | 7/1990 | |
| JP | H09278900 A | 10/1997 | |
| JP | 2001162147 A | 6/2001 | |
| JP | 2004300425 A | 10/2004 | |
| JP | 2008038128 A | 2/2008 | |
| JP | 6076455 B2 | 2/2017 | |
| KR | 20070104663 A | 10/2007 | |
| KR | 20080075221 A | 8/2008 | |
| KR | 20170052480 A | 5/2017 | |
| KR | 20180127377 A | 11/2018 | |
| KR | 101967807 B1 | 4/2019 | |
| KR | 20190088830 A | 7/2019 | |
| MY | 157687 A * | 7/2016 | ............. A61L 15/24 |
| WO | 1991017200 A1 | 11/1991 | |
| WO | 9607380 A1 | 3/1996 | |
| WO | 2014168858 A1 | 10/2014 | |
| WO | 2015163516 A1 | 10/2015 | |

* cited by examiner

METHOD FOR PREPARING SUPERABSORBENT POLYMER

CROSS-REFERENCE TO RELATED APPLICATION(S)

The present application is a national phase entry under 35 U.S.C. § 371 of International Application No. PCT/KR2020/015363, filed on Nov. 5, 2020, which claims the benefit of Korean Patent Application No. 10-2019-0140502, filed on Nov. 5, 2019, and Korean Patent Application No. 10-2020-0146310, filed on Nov. 4, 2020, the disclosures of which are herein incorporated by reference.

TECHNICAL FIELD

This invention relates to a method for preparing superabsorbent polymer. More specifically, this invention relates to a method for preparing superabsorbent polymer that can improve a moisture content of superabsorbent polymer to prevent surface property change according to external change, and decrease the amount of fine powder generated to improve processability during manufacture of articles using superabsorbent polymer.

BACKGROUND ART

Super absorbent polymer (SAP) is synthetic polymer material that can absorb moisture of 500 to 1000 times of self-weight, and is also named differently as super absorbency material (SAM), absorbent gel material (AGM), etc. according to developing companies. The superabsorbent polymer began to be commercialized as sanitary items, and currently, it is being widely used as hygienic goods such as disposable diapers, sanitary pads, and the like, water-holding material for soil, water stop material for civil engineering and architecture, sheets for raising seedling, freshness preservatives in the field of food circulation, fomentation material, and the like.

As the methods for preparing superabsorbent polymer, an inverse suspension polymerization method or an aqueous solution polymerization method, and the like are known. The inverse suspension polymerization is disclosed, for example, in Japanese Laid-Open Patent Publication No. 56-161408, No. 57-158209, and No. 57-198714, and the like.

As the aqueous solution polymerization method, a thermal polymerization method wherein polymerization is conducted while breaking and cooling polymer gel in a kneader equipped with plural axes, and a photopolymerization method wherein polymerization and drying are simultaneously conducted by irradiating UV, and the like to a high concentration aqueous solution on a belt, and the like are known.

Hydrogel polymer obtained through the polymerization reaction is generally subjected to a drying process, and then, is commercially available as a powder product.

Meanwhile, in order to obtain superabsorbent polymer having more excellent properties, a surface cross-linking reaction is conducted after polymerization. In general, the surface cross-linking reaction is conducted by spraying a surface cross-linking solution prepared by adding a cross-linking agent to water to the surface of superabsorbent polymer, and stirring, and then, heating to react.

However, since the surface cross-linking reaction by heating is commonly conducted at a high temperature of 140° C. or more, most of moisture included in superabsorbent polymer is evaporated, and thus, a moisture content of the finally prepared superabsorbent polymer significantly decreases. Such superabsorbent polymer having low moisture content may be easily surface-damaged by friction between particles generated during transfer and storage, thus finally deteriorating the properties of superabsorbent polymer. And, during a commercialization process using superabsorbent polymer having low moisture content, the amount of fine powder generated increases, and thus, process stability and productivity are deteriorated, and the qualities of products are deteriorated.

Thus, a method of increasing a moisture content of superabsorbent polymer by conducting a hydration process after surface cross-linking has been suggested.

As the hydration method for increasing a moisture content of superabsorbent polymer, a direct introduction method through line and an introduction method using a spray nozzle are mainly used. However, in the case of introduction through line, droplet size is large, and thus, a mixture of agglomerate of particles having high moisture content and common particles having low moisture content may be generated. To the contrary, in the case of introduction through a spray nozzle, moisture content may be uniformly increased, but due to small droplet size, flow may be generated, and thus, device pollution and generation of foreign substance may be caused.

DETAILED DESCRIPTION OF THE INVENTION

Technical Problem

In order to solve the problems of the prior art, it is an object of the invention to provide a method for preparing superabsorbent polymer that can uniformly control the size of droplets used during hydration, thereby improving a moisture content of superabsorbent polymer to prevent surface property change according to external change, and decrease the amount of fine powder generated to improve processability, such as back filter block prevention, anti-caking, and the like, during manufacture of articles using superabsorbent polymer, and superabsorbent polymer prepared thereby.

Technical Solution

In order to achieve the object, there is provided a method for preparing superabsorbent polymer, comprising steps of:
preparing a hydrogel polymer by carrying out a thermal polymerization or photopolymerization of a monomer composition comprising a water soluble ethylenically unsaturated monomer and a polymerization initiator;
drying and grinding the hydrogel polymer to prepare a base resin powder;
adding a surface cross-linking agent to the base resin powder and conducting surface cross-linking to prepare surface cross-linked base resin powder; and
hydrating the surface cross-linked base resin powder by pulse spraying water,
wherein a scattering index of droplet generated during the pulse spraying, according to the following Mathematical Formula 1, is 5 to 10:

Scattering index=[(Re droplet)/(Re air)]×100     [Mathematical Formula 1]

in the Mathematical Formula 1, Re droplet is Reynolds number of droplet, and Re air is Reynolds number of air.

Advantageous Effects

According to the method for preparing a superabsorbent polymer, a superabsorbent polymer having improved moisture content, without concern about surface property change according to external change, can be prepared. And, an amount of fine powders in the superabsorbent polymer can be decreased, and thus, when preparing absorbent articles using the same, processability can be improved, such as back filter block prevention, anti-caking, and the like.

DETAILED DESCRIPTION OF THE EMBODIMENTS

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Hereinafter, a method for preparing superabsorbent polymer and superabsorbent polymer prepared thereby according to the present disclosure will be explained in detail.

Previously, during hydration for increasing a moisture content of superabsorbent polymer, in case a common spray nozzle is used, as the diameter of the nozzle is smaller, the size of droplets generated during spraying decreases. Wherein, in case particle size is too small, the particles may be scattered to cause pollution. And, in case the diameter of a nozzle is increased and flow is small, large droplets may be formed without spraying. However, if the size of droplet increases, it may be difficult to sufficiently hydrate superabsorbent polymer, and aggregation between surface cross-linked polymer particles may be induced, and thus, coarse particles having particle sizes greater than 850 μm may be generated in large quantities in the finally prepared superabsorbent polymer, thus generating back filer block and caking.

Thus, in the present disclosure, during hydration, by uniformly and easily controlling droplet size using a spray nozzle in which water is sprayed according to pulse, a moisture content of superabsorbent polymer may be increased to prevent surface property change according to external change, and the amount of fine powder generated may be decreased to improve processability during manufacture of articles using superabsorbent polymer.

Specifically, the method for preparing superabsorbent polymer according to one embodiment of the invention comprises steps of:

preparing a hydrogel polymer by carrying out a thermal polymerization or photopolymerization of a monomer composition comprising a water soluble ethylenically unsaturated monomer and a polymerization initiator (step 1);

drying and grinding the hydrogel polymer to prepare a base resin powder (step 2);

adding a surface cross-linking agent to the base resin powder and conducting surface cross-linking to prepare surface cross-linked base resin powder (step 3); and hydrating the surface cross-linked base resin powder by pulse spraying water (step 4), wherein a scattering index of droplet generated during the pulse spraying, according to the following Mathematical Formula 1, is 5 to 10:

Scattering index=[(Re droplet)/(Re air)]× 100    [Mathematical Formula 1]

in the Mathematical Formula 1, Re droplet is the Reynolds number of droplet, and Re air is the Reynolds number of air.

The conditions during pulse spraying, for example, orifice diameter, pulse on rate, water introduction flow, pulse cycle, and the like, have an influence on the size of droplet, and by controlling these conditions, the size of droplets generated may be optimized to the range within which a moisture content of superabsorbent polymer may be improved, and generation of fine particles or coarse particles may be minimized. In the present disclosure, based on the influence of the conditions during pulse spraying on the size of droplet, optimum size of droplet is defined as a scattering index using Reynolds number of droplet.

Specifically, in the present disclosure, a scattering index of droplets generated during pulse spraying according to the above Mathematical Formula 1 may be 5 or more, or 6 or more, or 7 or more, or 7.5 or more, or 7.8 or more, and 10 or less, or 9 or less, or 8.8 or less. If the scattering index of droplet is less than 5, or greater than 10, fine droplets having particle size of 300 μm or less may increase, and thus, pollution of a reactor may become serious, or the content of coarse particles having particle sizes greater than 850 μm in the prepared superabsorbent polymer may significantly increase.

In the Mathematical Formula 1, the Reynolds number indicates the ratio of inertial force and viscous force of flow in fluid mechanics, and is proportional to the density of fluid, flow rate, and the length of an article in the flow, and is inversely proportional to viscosity coefficient of fluid.

Specifically, Reynolds numbers of fluids, namely droplet and air, may be respectively calculated according to the following Mathematical Formula 2.

Reynolds number=(density of fluid×average flow rate of fluid×characteristic length of fluid)/viscosity coefficient of fluid [Mathematical Formula 2]

In the Mathematical Formula 2, fluid is droplet (water) or air, and for the density and viscosity coefficient of fluid, literary values may be used. Specifically, in case the fluid is droplet (water), the density of fluid is 1000 kg/$m^3$, which is the literary density value of water at 25° C., and the viscosity coefficient is 10 kg/m/sec. And, in case the fluid is air, the density of air is 1.12 kg/$m^3$, which is the literary value at 25° C., and the viscosity coefficient is 0.17 kg/m/sec.

And, in the Mathematical Formula 2, the average flow rate of fluid may be predicted through flow analysis. Specifically, the average flow rate of droplets may be calculated by dividing the flow of fluid introduced into a reactor, namely water introduction flow ($m^3$/hr), by the cross-sectional area in the flow direction of the fluid water (in the present disclosure, the cross-sectional area of an orifice perpendicular to the flow direction of water, because water flows inside an orifice). And, the average flow rate of air may be calculated by dividing the flow of air introduced into a reactor, namely sweep air flow ($m^3$/sec), by the cross-sectional area in the flow direction of air in the reactor, namely the area of the internal cross-section of a reactor perpendicular to the flow direction of air introduced into the reactor. Meanwhile, the cross-section in the flow direction means a cross-section when the fluid is cut in a direction perpendicular to the flow direction during flowing.

And, the characteristic length of fluid means a length influencing flow property or heat transfer property, and in the case of external flow, the characteristic length of fluid (Lc) is obtained by dividing the cross-sectional area by cross-sectional perimeter (Lc=cross-sectional area/cross-sectional perimeter), and in the case of internal flow such as flow in pipe, considering the influence of frictional resistance of pipe wall on the flow, hydraulic diameter (Dh) is used, wherein the hydraulic diameter is a value obtained by dividing 4 times of the cross-sectional area in the flow direction by wetted perimeter (Dh=4(cross-sectional area)/wetted perimeter).

In the present disclosure, the characteristic length of droplet is the mean diameter of droplets (SMD). And, in the case of air, as it passes through a reactor, the cross-section in the flow direction of air corresponds to the internal cross-section of a reactor perpendicular to the flow direction of air. For example, in case a reactor has a shape of rectangular duct, the cross-section in the flow direction of air is rectangle, and the characteristic length may be calculated according to the following Mathematical Formula 3:

Characteristic length of air=[4×(width of cross-section of reactor×length of cross-section of reactor)]/[2×(width of cross-section of reactor+length of cross-section of reactor)]    [Mathematical Formula 3]

In the Mathematical Formula 3, the width and length of the cross-section of a reactor are width and length of the internal cross-section of a reactor perpendicular to the flow direction of air.

Specifically, the Reynolds number of droplet calculated according to the above Mathematical Formula 2 may be 0.2 to 0.35, more specifically, 0.2 or more, or 0.22 or more, or 0.23 or more, or 0.24 or more, and 0.35 or less, or 0.3 or less, or 0.28 or less, or 0.27 or less. And, the Reynolds number of air calculated according to the above Mathematical Formula 2 may be 2 to 5, more specifically, 2 or more, or 2.5 or more, or 2.8 or more, or 3 or more, and 5 or less, or 4.5 or less, or 4 or less, or 3.5 or less.

And, the mean diameter (SMD) of droplets may be 400 to 600 μm, more specifically, 400 μm or more, or 450 μm or more, and 600 μm or less, or 580 μm or less, or 550 μm or less. And, the rate of droplets having diameters of 300 μm or less in the generated droplets may be 10 wt % or less, or 9 wt % or less, or 8.5 wt % or less, based on the total weight of droplets. As the content of droplets having diameters of 300 μm or less is smaller, it is more preferable, but considering preparation process conditions, the rate of droplets having diameters of 300 μm or less in the generated droplets may be 3 wt % or more, or 5 wt % or more, or 5.5 wt % or more. Within the above diameter range, as the content of fine droplets having diameters of 300 μm or less that may generate flow or pollute an apparatus decreases, not only a moisture content of superabsorbent polymer may be improved, but also a degree of pollution may be minimized.

In the present disclosure, mean diameter (SMD) of droplets generated during pulse spraying, and the rate of droplets having diameters of 300 μm or less in the droplets may be measured by laser image analysis, and specific measurement method will be explained in detail in experimental examples later.

In the preparation method according to one embodiment of the invention, the pulse spraying process may be conducted under control conditions fulfilling the above conditions of droplets.

Hereinafter, a method for preparing superabsorbent polymer according to one embodiment will be explained according to each step.

First, in the method for preparing superabsorbent polymer according to one embodiment, step 1 is a step wherein thermal polymerization or photopolymerization of a monomer composition is conducted to form hydrogel polymer.

The monomer composition, which is the raw material of superabsorbent polymer, comprises water soluble ethylenically unsaturated monomers and a polymerization initiator.

As the water soluble ethylenically unsaturated monomers, any monomers commonly used for the preparation of superabsorbent polymer may be used without specific limitations. Specifically, one or more monomers selected from the group consisting of anionic monomers and salts thereof, non-ionic hydrophilic group-containing monomers, and amino group-containing unsaturated monomers and quaternized products thereof may be used.

Specifically, one or more selected from the group consisting of anionic monomers and salts thereof, such as (meth)acrylic acid, maleic anhydride, fumaric acid, crotonic acid, itaconic acid, 2-acryloylethane sulfonic acid, 2-methacryloylethane sufonic acid, 2-(meth)acryloylpropane sulfonic acid or 2-(meth)acrylamide-2-methyl propane sulfonic acid; non-ionic hydrophilic group-containing monomers, such as (meth)acrylamide, N-substituted (meth)acrylate, 2-hydroxyethyl(meth)acrylate, 2-hydroxypropyl(meth)acrylate, methoxypolyethyleneglycol(meth)acrylate or polyethyleneglycol(meth)acrylate; and amino group-containing unsaturated monomers, such as (N,N)-dimethylaminoethyl(meth)acrylate or (N,N)-dimethylaminopropyl(meth)acrylamide, and quaternized products thereof may be used.

More preferably, acrylic acid or salts thereof, for example, acrylic acid or an alkali metal salt such as a sodium salt thereof may be used, and using such monomers, superabsorbent polymer having more excellent properties can be prepared. In case an alkali metal salt of acrylic acid is used as monomer, the acrylic acid may be neutralized with a base compound such as caustic soda (NaOH) before use. Wherein, the neutralization degree may be 40 to 95 mol %, or 40 to 80 mol %, or 45 to 75 mol %. Although the range of the neutralization degree may vary according to the final properties, if the neutralization degree is too high, neutralized monomers may be precipitated, thus rendering smooth progression of polymerization difficult, and to the contrary, if the neutralization degree is too low, the absorption of the polymer may be significantly lowered, and the polymer may exhibit rubber-like property, which is difficult to handle.

The concentration of the water soluble ethylenically unsaturated monomers may be about 20 to about 60 wt %, preferably about 40 to about 50 wt %, based on the monomer composition comprising raw materials and solvents, and it may be appropriately adjusted considering polymerization time and reaction conditions, and the like. However, if the concentration of the monomers is too low, yield of superabsorbent polymer may decrease, thus causing a problem in terms of economical efficiency, and if the concentration is too high, the monomers may be partially precipitated or grinding efficiency during grinding of polymerized hydrogel polymer may be low, thus causing process problems, and the properties of superabsorbent polymer may be deteriorated.

And, the polymerization initiator used during polymerization of water soluble ethylenically unsaturated monomers is not specifically limited as long as it is commonly used for the preparation of superabsorbent polymer.

Specifically, as the polymerization initiator, a thermal polymerization initiator or a photopolymerization initiator may be used according to polymerization method. However, even in the case of photopolymerization, since a certain amount of heat is generated by UV irradiation, etc., and heat is generated to some degree according to the progression of an exothermic polymerization reaction, a thermal polymerization initiator may be additionally used.

As the photopolymerization initiator, any compounds capable of forming radicals by light such as UV may be used without limitations.

As the photopolymerization initiator, for example, one or more selected from the group consisting of benzoin ether, dialkyl acetophenone, hydroxyl alkylketone, phenyl glyoxylate, benzyl dimethyl ketal, acyl phosphine, and α-aminoketone may be used. As specific examples of the acyl phosphine, commercially available lucirin TPO, namely 2,4,6-trimethyl-benzoyl-trimethyl phosphine oxide) may be used. More various photopolymerization initiators are described in Reinhold Schwalm, "UV Coatings: Basics, Recent Developments and New Application (Elsevier 2007)", page 115, and are not limited to the above described examples.

The photopolymerization initiator may be included in the concentration of about 0.001 to about 1 part by weight, or 0.005 to 0.1 parts by weight, based on 100 parts by weight of the monomers. If the content of the photopolymerization initiator is less than 0.001 parts by weight, polymerization speed may become slow, and if the content of the photopolymerization initiator is greater than 1 part by weight, the molecular weight of superabsorbent polymer may be small and the properties may become non-uniform.

And, as the thermal polymerization initiator, at least one selected from the group consisting of a persulfate initiator, an azo initiator, hydrogen peroxide, and ascorbic acid may be used. Specific examples of the persulfate initiator may include sodium persulfate ($Na_2S_2O_8$), potassium persulfate ($K_2S_2O_8$), ammonium persulfate (($NH_4)_2S_2O_8$), etc., and, specific examples of the azo initiator may include 2,2-azobis(2-amidinopropane)dihydrochloride, 2,2-azobis-(N,N-dimethylene)isobutyramidinedihydrochloride, 2-(carbamoylazo)isobutyronitril, 2,2-azobis[2-(2-imidazolin-2-yl)propane]dihydrochloride, 4,4-azobis-(4-cyanovalericacid), etc. More various thermal polymerization initiators are described in "Principle of Polymerization (Wiley, 1981)", Odian, page 203, and are not limited to the above described examples.

The thermal polymerization initiator may be included in the content of 0.001 to 1 parts by weight, or 0.01 to 0.5 parts by weight, based on 100 parts by weight of the monomers. If the content of the thermal polymerization initiator is less than 0.001 parts by weight, additional thermal polymerization may hardly occur, and thus, the effect according to the addition of the thermal polymerization initiator may be insignificant, and if the content of the thermal polymerization initiator is greater than 1 part by weight, the molecular weight of superabsorbent polymer may be small and the properties may become non-uniform.

According to one embodiment of the invention, the monomer composition may further comprise an internal crosslinking agent as the raw material of superabsorbent polymer. As the internal crosslinking agent, a crosslinking agent having one or more functional groups capable of reacting with the water soluble substituents of the acrylic acid based monomers, and having one or more ethylenically unsaturated groups; or a crosslinking agent having two or more functional groups capable of reacting with the water soluble substituents of the acrylic acid based monomers and/or water soluble substituents formed by hydrolysis of the monomers, may be used.

As specific examples of the internal crosslinking agent, C8-12 bisacrylamide, bismethaacrylamide, poly(meth)acrylate of C2 to 10 polyhydric alcohol-based compound or poly(meth)allylether of C2 to 10 polyhydric alcohol-based compound, and the like may be mentioned, and more specifically, one or more selected from the group consisting of N,N'-methylenebis(meth)acrylate, ethyleneoxy(meth) acrylate, polyethyleneoxy(meth) acrylate, propyleneoxy(meth)acrylate, glycerin diacrylate, glycerin triacrylate, trimethylol triacrylate, triallylamine, triaryl cyanurate, triallyl isocyanate, polyethyleneglycol diacrylate, polyethyleneglycol, diethyleneglycol and propyleneglycol may be used.

Such an internal crosslinking agent may be used in the content of 0.01 to 1 part by weight, or 0.1 to 0.5 parts by weight, based on 100 parts by weight of the monomers, thus crosslinking polymerized polymer. If the content of an internal cross-linking agent is less than 0.01 parts by weight, improvement effect according to cross-linking may be insignificant, and if it is greater than 1 part by weight, absorption power of superabsorbent polymer may be deteriorated.

In the preparation method of the present disclosure, the monomer composition may further comprise additives such as a thickener, a plasticizer, a preservation stabilizer, an antioxidant, etc., as necessary.

The raw materials, such as water soluble ethylenically unsaturated monomers, a photopolymerization initiator, a thermal polymerization initiator, an internal crosslinking agent and additives, may be prepared in the form of a monomer composition solution dissolved in a solvent.

Wherein, a solvent that can be used is not limited in terms of its construction as long as it can dissolve or disperse the above explained raw materials, and for example, one or more selected from water, ethanol, ethyleneglycol, diethyleneglycol, triethyleneglycol, 1,4-butanediol, propyleneglycol, ethyleneglycol monobutyl ether, propyleneglycol monomethyl ether, propyleneglycol monomethyl ether acetate, methylethylketone, acetone, methylamylketone, cyclohexanone, cyclopentanone, diethyleneglycol monomethyl ether, diethyleneglycol ethyl ether, toluene, xylene, butyrolactone, carbitol, methylcellosolve acetate and N,N-dimethylacetamide, etc. may be used alone or in combination.

The solvent may be included in the remaining amount expect the above described components, based on the total amount of the monomer composition.

Meanwhile, a method of forming hydrogel polymer by thermal polymerization or photopolymerization of the monomer composition is not specifically limited, as long as it is a commonly used polymerization method.

Specifically, the polymerization method is largely classified into thermal polymerization and photopolymerization according to energy source. Commonly, thermal polymerization may be progressed in a reactor equipped with a stirring axis such as a kneader, and photopolymerization may be progressed in a reactor equipped with a movable conveyer belt, but the above explained polymerization is no more than one example, and the present disclosure is not limited thereto.

For example, hydrogel polymer may be obtained by introducing the above described monomer composition into a reactor equipped with a stirring axis such as a kneader, and supplying hot air or heating the reactor to progress thermal polymerization. Wherein, the hydrogel polymer discharged to the outlet of the reactor may be obtained in the size of a few centimeters to a few millimeters according to the shape of the stirring axis equipped in the reactor. Specifically, the size of obtained hydrogel polymer may vary according to the concentration of the introduced monomer composition and the introduction speed, etc., and commonly, hydrogel polymer with weight average particle diameter of 2 to 50 mm may be obtained.

And, in case photopolymerization is progressed in a reactor equipped with a movable conveyer belt as explained above, the obtained hydrogel polymer may be in the form of a sheet having the width of the belt. Wherein, the thickness of the polymer sheet may vary according to the concentration of the introduced monomer mixture and the introduction speed, but, commonly, a monomer mixture is preferably fed such that polymer in the form of a sheet having a thickness of about 0.5 cm to about 5 cm may be obtained. In case a monomer mixture is fed such that the thickness of sheet-shaped polymer may be too thin, production efficiency may be low, and if the thickness of the sheet-shaped polymer is greater than 5 cm, due to the too thick thickness, a polymerization reaction may not uniformly occur throughout the entire thickness.

Wherein, the moisture content of hydrogel polymer obtained by such a method may be about 40 to about 80 wt %, based on the total weight of hydrogel polymer. Throughout the specification, the "moisture content" is the content of moisture occupied based on the total weight of hydrogel polymer, and it means a value obtained by subtracting the weight of polymer of a dry state from the weight of hydrogel polymer. Specifically, it is defined as a value calculated by measuring the weight loss according to moisture evaporation in the polymer while raising the temperature of polymer through infrared heating to dry. Wherein, the drying condition is set up such that the temperature is raised from room temperature to about 180° C. and then maintained at 180° C., and the total drying time is 20 minutes including a temperature raising step of 5 minutes.

Meanwhile, after preparing the hydrogel polymer, before the subsequent drying and grinding process, a process of coarsely grinding the prepared hydrogel polymer may be optionally conducted.

The coarse grinding is a process for increasing drying efficiency in the subsequent drying process and controlling particle size of the finally prepared superabsorbent polymer, wherein, grinders that can be used in the coarse grinding are not limited in terms of the constructions, but specifically, one selected from the group consisting of a vertical pulverizer, a turbo cutter, a turbo grinder, a rotary cutter mill, a cutter mill, a disc mill, a shred crusher, a crusher, a chopper, a disc cutter may be used, but the present disclosure is not limited thereto.

The coarse grinding step may be progressed, for example, such that particle diameter of hydrogel polymer may become about 2 to about 10 mm. Grinding to a particle diameter of less than 2 mm would not be technically easy due to the high moisture content of the hydrogel polymer, and may generate aggregation between the ground particles. Meanwhile, if grinding to a particle diameter greater than 10 mm, the effect of increasing the efficiency of the subsequent drying step may be insignificant.

Next, the step 2 is a step wherein the hydrogel polymer prepared in the step 1 is dried and ground.

The drying may be conducted at a temperature of about 150° C. to about 250° C. If the drying temperature is less than about 150° C., a drying time may too lengthen, and the properties of the finally prepared superabsorbent polymer may be deteriorated, and if the drying temperature is greater than about 250° C., only the surface of hydrogel polymer may be dried, thus generating fine powder in the subsequent grinding process, and the properties of the finally prepared superabsorbent polymer may be deteriorated. Preferably, the drying may be progressed at a temperature of about 150 to 200° C., more preferably at 160 to 180° C.

Meanwhile, the drying may be progressed for about 20 minutes to about 90 minutes considering the process efficiency, but it is not limited thereto.

And, the drying method is not limited in terms of the construction as long as it can be commonly used as a drying process of hydrogel polymer. Specifically, the drying step may be progressed by hot wind supply, infrared ray irradiation, ultrahigh frequency wave irradiation, or UV irradiation, etc. The polymer dried by such a method may exhibit a moisture content of about 5 to about 10 wt %.

After drying, grinding is conducted.

The grinding may be conducted such that polymer powder, namely base resin powder may have a particle diameter of about 150 to about 850 μm. As a grinder used for grinding to such a particle diameter, specifically, a pin mill, a hammer mill, a screw mill, a roll mill, a disc mill, or a jog mill, etc. may be used, but the present disclosure is not limited thereto.

And, after the grinding step, in order to manage the properties of superabsorbent polymer powder finally commercialized, a process of classifying ground polymer powders according to particle diameters may be further conducted.

Preferably, polymers having particle size of about 150 to about 850 μm may be classified, and only the polymer having such particle diameter may be used as base resin powder and subjected to a surface cross-linking reaction and commercialized.

Next, the step 3 is a step wherein the base resin powder obtained by drying and grinding in the step 2 is mixed with a surface cross-linking agent, and heated to conduct a surface cross-linking reaction.

The surface cross-linking is a step of increasing the cross-linking density around the surface of base resin powder, in relation to the cross-linking density inside of the particles. In general, since the surface cross-linking agent is applied on the surface of base resin powder, the surface cross-linking reaction occurs on the surface of base resin powder, thereby improving cross-linkability on the surfaces of particles without substantially influencing the inside of the particles. Thus, surface cross-linked base resin powder has higher cross-linking degree around the surfaces than inside.

Wherein, the surface cross-linking agent is not limited as long as it is a compound capable of reacting with the functional groups of polymer.

Preferably, in order to improve the properties of produced superabsorbent polymer, as the surface cross-linking agent, one or more selected from the group consisting of polyhydric alcohol-based compound; epoxy compounds; polyamine compound; haloexpoy compounds; condensation products of haloexpoy compounds; oxazoline compounds; mono-, di- or polyoxazolidinone compounds; cyclic urea compound; multivalent metal salts; and alkylene carbonate-based compound may be used.

Specifically, as the examples of the polyhydric alcohol-based compounds, one or more selected from the group consisting of ethyleneglycol, propyleneglycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol and glycerol may be used.

And, as the epoxy compounds, one or more selected from the group consisting of ethylene glycol diglycidyl ether and glycidol, and the like may be used, and as the polyamine compounds, ethylenediamine, diethylenetriamine, triethylenetetraamine, tetraethylenepentamine, pentaethylenehexamine, polyethyleneimine and polyamide polyamine may be used.

And, as the haloepoxy compounds, epichlorohydrin, epibromohydrin, and α-methylepichlorohydrin may be used. Meanwhile, as the mono-, di- or polyoxazolidinone compounds, for example, 2-oxazolidinone may be used.

And, as the alkylene carbonate-based compounds, C2-6 alkylene carbonate such as ethylene carbonate, or propylene carbonate, and the like may be used. These compounds may be used alone or in combination of two or more kinds of alkylene carbonates having different carbon numbers.

And, as the multivalent metal salt, sulfate containing metal such as aluminum, and the like, or carboxylate, and the like may be used, and more specifically, aluminum sulfate, or aluminum carboxylate, or a mixture thereof may be used. Among them, aluminum sulfate may be more preferably used.

Among the above surface cross-linking agents, it is preferable to use a polyhydric alcohol-based compound, an alklylene carbonate-based compound, and a multivalent metal salt in combination, so as to increase surface cross-linking efficiency. More specifically, based on 100 parts by weight of base resin powder, 0.01 to 2 parts by weight or 0.1 to 1 part by weight of a polyhydric alcohol-based compound; 0.01 to 3 parts by weight, or 0.05 to 2 parts by weight, or 0.1 to 1 part by weight of an alkylene carbonate-based compound; and 0.1 to 1 part by weight, or 0.2 to 0.5 parts by weight of a multivalent metal salt may be mixed and used. And, the surface cross-linking agent comprising a polyhydric alcohol-based compound, an alkylene carbonate-based compound, and a multivalent metal salt may comprise aluminum sulfate as the multivalent metal salt, in an amount of 0.1 to 1 part by weight, or 0.2 to 0.5 parts by weight, based on 100 parts by weight of the base resin powder.

And, the surface cross-linking agent may further comprise inorganic particles, specifically hydrophilic inorganic particles, and superabsorbent polymer prepared thereby may further comprise hydrophilic inorganic particles in the surface crosslink layer.

In case the hydrophilic inorganic particles are included in the surface cross-linking agent, the hydrophilic inorganic particles surround the surface cross-linking agent. Thus, the surface cross-linking agent may be prevented from being locally rapidly absorbed in only a part of base resin powder, and uniformly coated over the whole surface of base resin powder, and thus, surface cross-linking may uniformly occur, and the properties of the finally prepared superabsorbent polymer, such as permeability, and the like, may be exhibited and maintained for a long time.

The hydrophilic inorganic particles may be silica particles, or metal oxide particles surface treated with a compound having a hydrophilic group, and the like. The metal oxide particles may be aluminum oxide particles, or titanium oxide particles, and the like. For another example, as the hydrophilic silica particles, commercially available hydrophilic silica particles such as A200 (Evonik corporation), and the like may be used.

Meanwhile, in the present disclosure, hydrophilicity may be defined as water contact angle of inorganic particles measured on a glass substrate being 0°.

The hydrophilic inorganic particles may be included in an amount of 0.005 to 0.2 parts by weight, or 0.01 to 0.1 parts by weight, based on 100 parts by weight of base resin powder.

A method of mixing the surface cross-linking agent with base resin powder is not specifically limited. The surface cross-linking agent and base resin powder may be put in a reactor and mixed, or the surface cross-linking agent may be sprayed to base resin powder, or base resin powder and surface cross-linking agent may be continuously fed to a continuously operated mixer and mixed.

In addition, water and alcohol may be additionally mixed together and the surface cross-linking agent may be added in the form of a surface cross-linking solution. In case water and alcohol are added, the surface cross-linking agent may be uniformly dispersed in base resin powder. Wherein, it is preferable that water and alcohol may be added in an amount of about 5 to about 12 parts by weight, based on 100 parts by weight of polymer, so as to induce uniform dispersion of the surface cross-linking agent, prevent agglomeration of base resin powder, and optimize surface penetration depth.

Base resin powder to which the surface cross-linking agent is added may be heated at a temperature of about 150 to about 220° C., preferably about 165 to about 210° C. for about 15 to about 100 minutes, preferably about 20 to about 80 minutes, thus achieving surface cross-linking. If cross-linking reaction temperature is less than 150° C., surface cross-linking may not sufficiently occur, and if it is greater than 220° C., surface cross-linking may be excessively progressed. And, if the cross-linking reaction time is less than 15 minutes, surface cross-linking may not sufficiently occur, and if it is greater than 100 minutes, due to excessive surface cross-linking reaction, cross-linking density of particle surface may become too high, and thus, the properties may be deteriorated.

A temperature rise means for the surface cross-linking reaction is not specifically limited. A heating medium may be supplied, or a heat source may be directly supplied to heat. Wherein, the kinds of the heating medium that can be used may include temperature-increased fluid such as steam, hot air, hot oil, etc., but are not limited thereto, and may be appropriately selected considering the means of the heating medium, temperature rise speed and a temperature to be increased. Meanwhile, the heat source directly supplied may include electric heating, gas heating, etc., but is not limited thereto.

The content of the surface cross-linking agent included in the surface cross-linking solution may be appropriately selected according to the kind of surface cross-linking agents or reaction conditions, but commonly, it may be used in the content of about 0.2 to about 2 parts by weight, preferably about 0.25 to about 1.5 parts by weight, based on 100 parts by weight of base resin powder. If the content of the surface cross-linking agent is too small, a surface cross-linking reaction may hardly occur, and if the content of the surface cross-linking agent is greater than 2 parts by weight based on 100 parts by weight of base resin powder, due to excessive surface cross-linking reaction, absorption capacity and properties may be deteriorated.

The surface cross-linked base resin powder obtained by the above method has a moisture content of about 0.1 to about 0.5 wt %. Such a very low moisture content results from the evaporation of most of moisture in base resin powder during the process of heating to high temperature in the surface cross-linking reaction. Such a very low moisture content causes increase in fine powder generation during transfer and storage of superabsorbent polymer. For example, superabsorbent polymer having the above range of moisture content generates about 1 to about 5 wt % of fine powder having particle size less than 150 μm, which causes deterioration of the properties of the final product.

Thus, in the present disclosure, a process of introducing water in the surface cross-linked base resin powder to hydrate is conducted. By the hydration, a moisture content of the final superabsorbent polymer may be increased to decrease dust generation, thereby improving process stability.

Next, in the preparation method according to one embodiment of the invention, a hydration step 4 is conducted by pulse spraying water to the surface cross-linked base resin powder prepared in step 3.

The pulse spraying generates water spray at a regular time interval, and may be conducted using a pulse type spray nozzle of which spraying is on/off according to pulse, such as a pulse jet nozzle.

The pulse spraying is conducted such that droplets generated may fulfill the scattering index requirement defined by the above Mathematical Formula 1, as explained above.

Specifically, during the pulse spraying, the size of droplet sprayed has an influence on the moisture content of superabsorbent polymer and the amount of coarse particles generated, and the size of droplet is influenced by the orifice diameter. In the present disclosure, a spray nozzle having orifice diameter of 1 to 2 mm, more specifically 1 mm or more, or 1.2 mm or more, and 2 mm or less, or 1.7 mm or less may be used. Within the above range of orifice diameter, in the pulse on rate range described below, water introduction flow may be appropriately controlled, specifically to 0.02 to 0.05 $m^3$/hr, and droplets generated may have appropriate size, thus improving a moisture content of superabsorbent polymer but inhibiting generation of coarse particles. If the orifice diameter is less than 1 mm, due to too small droplet size, flow may be generated, apparatus may be polluted and foreign substance may be generated. Meanwhile, if the orifice diameter is greater than 2 mm, droplet size may increase, and thus, a moisture content of superabsorbent polymer may excessively increase to deteriorate absorption power to the contrary, and there is a concern about increase in the generation of coarse particles having particle sizes greater than 850 μm.

And, during the pulse spraying, a pulse cycle (Hz) means the number of on/off per minute, and in the present disclosure, the pulse cycle may be 1 to 2000 Hz, more specifically 1 Hz or more, or 10 Hz or more, and 2000 Hz or less, or 1000 Hz or less, or 500 Hz or less. When the pulse cycle is within the above range, within the above explained orifice diameter range, appropriate flow may be achieved, and thus, droplet size may be optimized to improve a moisture content of superabsorbent polymer and inhibit generation of fine powder and coarse particles. If the pulse cycle is less than 1 Hz, pulse effect may weaken, and thus, there is a concern about reduction of effect according to increase in droplet size, and if the pulse cycle is greater than 2000 Hz, on/off switch may not be smooth, and thus, there is a concern about reduction of effect according to flow change or droplet size change.

And, during the pulse spraying, a pulse on rate means a rate of time for which spraying is achieved according to pulse application in the entire spraying process, and in the present disclosure, the pulse on rate may be 10 to 50%, more specifically 10% or more, or 20% or more, and 50% or less, or 35% or less of the total pulse spraying time. If the pulse on rate is less than 10%, the amount of droplets generated may be small, and thus, it may be difficult to achieve sufficient hydration, and if it is greater than 50%, the amount of droplets generated may be too large, thus generating aggregation between hydrated particles, and thus, there is a concern about increase in the content of coarse particles in superabsorbent polymer.

Meanwhile, as the content of water increases during hydration, a moisture content of the finally prepared superabsorbent polymer increases. However, if a moisture content of superabsorbent polymer exceeds a certain level, absorption power may decrease to the contrary, and if the content of water is excessively high, due to aggregation between hydrated particles, the content of coarse particles in the finally prepared superabsorbent polymer may increase. The water introduction flow may be controlled by the above explained pulse on rate, orifice diameter and flow, spray pressure applied to water during pulse spraying, and the like, and more specifically, in the present disclosure, the water introduction flow during the pulse spraying may be 0.02 to 0.05 $m^3$/hr, more specifically 0.02 $m^3$/hr or more, or 0.025 $m^3$/hr or more, or 0.024 $m^3$/hr or more, and 0.05 $m^3$/hr or less, or 0.04 $m^3$/hr or less, or 0.035 $m^3$/hr or less, or 0.03 $m^3$/hr or less. If the flow is less than 0.02 $m^3$/hr, moisture content increasing effect according to hydration may be insignificant, and if it is greater than 0.05 $m^3$/hr, droplet size may increase, and thus, a moisture content of superabsorbent polymer may excessively increase, and absorption power may decrease to the contrary, and there is a concern about increase in the generation of coarse particles having particles sizes greater than 850 μm.

By controlling pulse spraying conditions as explained above, droplets generated through a spray nozzle may fulfill optimized droplet requirements capable of improving a moisture content of superabsorbent polymer and minimizing the generation of fine particles or coarse particles. In the present disclosure, such droplet requirement is defined as a scattering index, and droplets generated during the pulse spraying may have a scattering index according to the following Mathematical Formula 1, of 5 or more, or 6 or more, or 7.5 or more, or 7.8 or more, and 10 or less, or 9 or less, or 8.8 or less. Since generated droplets have a scattering index within the above range, fine droplets having particle sizes of 300 μm or less may decrease, and thus, reactor pollution may be minimized, and the content of coarse particles having particles sizes greater than 850 μm may be significantly decreased by controlling a moisture content in the prepared superabsorbent polymer.

Superabsorbent polymer according to one embodiment of the invention prepared through the above preparation process comprises: base resin powder comprising a first cross-linked polymer of water soluble ethylenically unsaturated monomers having acid groups of which at least a part are neutralized; and a surface crosslink layer formed on the base resin powder, and comprising a second cross-linked polymer formed by additional cross-linking of the first cross-linked polymer by a surface cross-linking agent. And, in case the surface cross-linking agent comprises hydrophilic inorganic particles, the surface crosslink layer may further comprise hydrophilic inorganic particles derived therefrom.

Superabsorbent polymer having the above construction and structure has excellent absorption power and high moisture content, and the content of coarse particles having particles sizes greater than 850 μm may be minimized and dust may be generated less, and thus, reactor pollution can be minimized. Thus, according to another embodiment of the invention, there are provided superabsorbent polymer prepared by the above preparation method, and articles comprising the same, such as absorber material, hygienic material, and the like.

Specifically, the superabsorbent polymer may have high moisture content of 1 to 5 wt %, more specifically, 1 wt % or more, or 1.5 wt % or more, or 1.8 wt % or more, and 5 wt % or less, or 3 wt % or less, or 2.5 wt % or less, based on the total weight of the superabsorbent polymer. As such, since a moisture content of superabsorbent polymer applied as a product may be maintained at an optimum level, the amount of fine powder generated during transfer and storage may be reduced, and thus, the qualities of the final product may be improved. The moisture content of superabsorbent polymer may be calculated by subtracting the weight of superabsorbent polymer in dry stage from the weight of superabsorbent polymer, and specific measurement method will be explained in detail in experimental examples later.

And, the superabsorbent polymer may have a particle size of 150 to 850 μm. More specifically, 95 wt % or more of the superabsorbent polymer may have a particle size of 150 to 850 μm, and the content of coarse particles having particle size greater than 850 μm may be 5 wt % or less, more specifically, 3 wt % or less, or 2.5 wt % or less, or 2 wt % or less of the total weight of superabsorbent polymer.

In the present disclosure, a particle size of superabsorbent polymer may be measured according to European Disposables and Nonwovens Association (EDANA) standard EDANA WSP 220.3, and the content of coarse particles in superabsorbent polymer is measured by classifying the superabsorbent polymer on standard sieves having gradations of 850 μm (20 mesh), 600 μm (30 mesh), 300 μm (50 mesh), and 150 μm (100 mesh), measuring the weight of coarse particles having particle size greater than 850 μm (20 mesh), and then, indicating a percentage of the content of coarse particles to the total weight of superabsorbent polymer, and the specific measurement method will be explained in detail in experimental examples later.

And, since the superabsorbent polymer has minimized coarse particle content as well as high moisture content, the content of superabsorbent polymer attached to reactor outer wall and rotor, namely pollution degree, may be minimized. Specifically, when superabsorbent polymer attached to reactor outer wall and rotor is separated and the weight is measured, and the weight ratio of attached superabsorbent polymer to the total superabsorbent polymer, namely pollution degree is calculated, the value is 2 wt % or less, or 1.7 wt % or less.

The superabsorbent polymer obtained by the above explained preparation method not only maintains excellent absorption performances such as centrifuge retention capacity and absorption under load, and the like, but also has increased moisture content, and decreased coarse particle content, thereby minimizing the amount of dust generated during the preparation process. Thus, it may be appropriately used as hygienic products such as a diaper, particularly, ultrathin hygienic products with decreased pulp content.

The present disclosure will be explained in more detail in the following examples. However, these examples are presented only as the illustrations of the invention, and the scope of the invention is not limited thereby.

Preparation Example 1

100 g of acrylic acid, 123.5 g of 32% caustic soda (NaOH), 0.2 g of a thermal polymerization initiator sodium persulfate, 0.008 g of a photopolymerization initiator diphenyl(2,4,6-trimethylbenzoyl)phosphine oxide, 0.24 g of polyethyleneglycol diacrylate, 0.18 g of laponite and 55.0 g of water were mixed to prepare a monomer composition having a total solid content of 43.8 wt %.

And then, the monomer composition was fed on a rotary belt having a width of 10 cm and a length of 2 m, and rotating at a speed of 50 cm/min, at a feeding speed of 500 to 2000 ml/min. Simultaneously with feeding of the monomer mixture, UV was irradiated at the intensity of 10 mW/cm$^2$ to progress UV polymerization for 60 seconds. After progressing the polymerization reaction, the reaction product was cut with a meat chopper, dried at 185° C. for 40 minutes using an air-flow oven, and ground to prepare base resin powder.

To 100 g of the base resin powder prepared above, a mixed solution of 6.0 g of ultrapure water, 0.5 g of propylene glycol, 0.4 g of ethylene carbonate, 0.01 g of hydrophilic silica particles (A200™, manufactured by Evonik corporation), and 0.2 g of aluminum sulfate was introduced, and they were mixed for 1 minute. The mixture was heated at 185° C. for 90 minutes, and dried, and then, classified to obtain surface cross-linked base resin powder of 150 to 850 μm.

Example 1

The surface cross-linked base resin powder prepared in Preparation Example 1 was subjected to a hydration process using a pulse type spray nozzle wherein water is sprayed only when pulse is applied, namely, pulse is on, thus preparing superabsorbent polymer.

Specifically, 10 kg of the surface cross-linked base resin powder prepared in Preparation Example 1 was put in a rotary reactor equipped with Sweep air and maintained at 50° C. And then, under conditions described in the following Table 1, air was introduced through Sweep air in the reactor, and water was sprayed to the surface cross-linked base resin powder at 0.03 m$^3$/hr through the orifice of the pulse type spray nozzle, thus conducting a hydration process for 10 seconds to prepare superabsorbent polymer.

Examples 2 and 3

Superabsorbent polymer was prepared by the same method as Example 1, except that a hydration process was conducted under conditions described in the following Table 1.

Comparative Example 1

Superabsorbent polymer was prepared by hydration according to a common method without pulse application, using a normal type spray nozzle.

Specifically, 10 kg of the surface cross-linked base resin powder prepared in Preparation Example 1 was put in a rotary reactor equipped with Sweep air, which is the same as Example 1, and maintained at 50° C. And then, under conditions described in the following Table 1, air was introduced through Sweep air in the reactor, and 0.106 m$^3$/hr of water was introduced through the orifice of the spray nozzle to conduct hydration for 10 seconds, thus preparing superabsorbent polymer.

Comparative Examples 2 and 3

Superabsorbent polymer was prepared by the same method as Comparative Example 1, except that hydration was conducted under conditions described in the following Table 1.

Comparative Examples 4 and 5

Superabsorbent polymer was prepared by the same method as Example 1, except that hydration was conducted under conditions described in the following Table 1.

TABLE 1

| | Type of spray nozzle | Orifice diameter (mm) | Orifice capacity (l/hr) @3 bar | Water introduction flow (m³/hr) | Sweep air flow (m³/sec) | Cross-sectional area of reactor (m²) | Spraying Pressure (bar) | Pulse cycle (Hz) | Pulse on rate (%) |
|---|---|---|---|---|---|---|---|---|---|
| Example 1 | Pulse type | 1.4 | 120 | 0.03 | 0.49 | 0.98 | 3 | 500 | 25 |
| Example 2 | Pulse type | 1.4 | 120 | 0.027 | 0.49 | 0.98 | 2.5 | 500 | 25 |
| Example 3 | Pulse type | 1.4 | 120 | 0.024 | 0.49 | 0.98 | 2 | 500 | 25 |
| Comparetive Example 1 | Normal type | 1.4 | 120 | 0.106 | 0.49 | 0.98 | 2.5 | — | 100 |
| Comparetive Example 2 | Normal type | 1.4 | 120 | 0.027 | 0.49 | 0.98 | 2.5 | — | 100 |
| Comparetive Example 3 | Normal type | 0.81 | 35.4 | 0.028 | 0.49 | 0.98 | 2.5 | — | 100 |
| Comparetive Example 4 | Pulse type | 1.4 | 120 | 0.017 | 0.49 | 0.98 | 2.5 | 500 | 5 |
| Comparetive Example 5 | Pulse type | 1.4 | 120 | 0.063 | 0.49 | 0.98 | 2.5 | 500 | 60 |

In Table 1, the pulse cycle (Hz) is the number of on/off per minute, the pulse on rate is the rate of time for which spraying is achieved according to pulse application during the entire pulse spraying process, and the cross-sectional area of a reactor means the area of the internal cross-section of a reactor perpendicular to the flow direction of air in the reactor.

Experimental Example

The properties of each superabsorbent polymer prepared in Examples and Comparative Examples were measured and evaluated by the following methods.

(1) Scattering Index

The scattering index of droplets generated in the spray nozzle during hydration according to Examples and Comparative Examples was calculated according to the following Mathematical Formula 1.

$$\text{Scattering index} = [(\text{Re droplet})/(\text{Re air})] \times 100 \quad \text{[Mathematical Formula 1]}$$

In the Mathematical Formula 1, Re droplet is the Reynolds number of droplet, and Re air is the Reynolds number of air, and the Reynolds number of droplet and Reynolds number of air can be respectively calculated according to the following Mathematical Formula 2.

$$\text{Reynolds number} = (\text{density of fluid} \times \text{average flow rate of fluid} \times \text{characteristic length of fluid})/\text{viscosity coefficient of fluid} \quad \text{[Mathematical Formula 2]}$$

In the Mathematical Formula 2, fluid is droplet or air.

Thus, in case the fluid is droplet, the density of droplet is 1000 kg/m³, which is the literary density value of water at 25° C. And, the average flow rate of droplets may be calculated by dividing the flow of fluid introduced into a reactor, namely water introduction flow(m³/hr), by the cross-sectional area in the flow direction of the fluid water, namely the cross-sectional area of an orifice perpendicular to the flow direction of water, and the average flow rate of droplets in this experiment is as described in the following Table 2. And, the characteristic length of droplet is the mean diameter of droplets (SMD), and can be measured according to the method described in (2) below, and the specific values are as described in the following Table 2. And, the viscosity coefficient of droplet is 10 kg/m/sec, which is the literary value of water at 25° C.

And, in case the fluid is air, the density of air is 1.12 kg/m³, which is the literary value of air at 25° C. And, the average flow rate of air may be calculated by dividing the flow of air introduced into a reactor, namely sweep air flow(m³/sec), by the cross-sectional area in the flow direction of air, namely, the area of the internal cross-section of a reactor perpendicular to the flow direction of air, and in this experiment, the internal cross-section of a reactor is rectangle, and the area was calculated as width×length, and as the result, the average flow rate of air was 0.5 m/s. And, the characteristic length of air is calculated by the following Calculation Formula using internal flow conditions, and in this experiment, the characteristic length of air was 0.933 m.

$$\text{Characteristic length of air} = [4 \times (\text{width of cross-section of reactor} \times \text{length of cross-section of reactor})]/[2 \times (\text{width of cross-section of reactor} + \text{length of cross-section of reactor})] \quad \text{[Mathematical Formula 3]}$$

In the Mathematical Formula 3, the width and length of the cross-section of a reactor are width and length of the internal cross-section of a reactor perpendicular to the flow direction of air. The internal cross-section of a reactor in the rotary reactor used when preparing superabsorbent polymer according to Examples and Comparative Examples was rectangle, and the width was 1.4 m and the length was 0.7 m.

And, the viscosity coefficient of air is 0.17 kg/m/sec, which is the literary value of air at 25° C.

During hydration in Examples and Comparative Examples, hydration conditions, Reynolds number of air and Reynolds number of water were respectively described in the following Table 2.

TABLE 2

| | Density of droplet (kg/m³) | Average flow rate of droplet (m/s) | SMD of droplet (μm) | Viscosity coefficient of droplet (kg/m/sec) | Reynolds number of droplet | Density of air (kg/m³) | Average flow rate of air m/s) | characteristic length of air (m) | Viscosity coefficient of air (kg/m/sec) | Reynolds number of air |
|---|---|---|---|---|---|---|---|---|---|---|
| Example 1 | 1000 | 5.42 | 471 | 10 | 0.26 | 1.12 | 0.5 | 0.933 | 0.17 | 3.07 |
| Example 2 | 1000 | 4.87 | 550 | 10 | 0.27 | 1.12 | 0.5 | 0.933 | 0.17 | 3.07 |
| Example 3 | 1000 | 4.33 | 530 | 10 | 0.24 | 1.12 | 0.5 | 0.933 | 0.17 | 3.07 |
| Comparative Example 1 | 1000 | 19.14 | 775 | 10 | 1.48 | 1.12 | 0.5 | 0.933 | 0.17 | 3.07 |
| Comparative Example 2 | 1000 | 4.87 | 3754 | 10 | 1.83 | 1.12 | 0.5 | 0.933 | 0.17 | 3.07 |
| Comparative Example 3 | 1000 | 15.10 | 241 | 10 | 0.36 | 1.12 | 0.5 | 0.933 | 0.17 | 3.07 |
| Comparative Example 4 | 1000 | 3.07 | 273 | 10 | 0.08 | 1.12 | 0.5 | 0.933 | 0.17 | 3.07 |
| Comparative Example 5 | 1000 | 11.37 | 813 | 10 | 0.92 | 1.12 | 0.5 | 0.933 | 0.17 | 3.07 |

(2) Mean Diameter of Droplet (SMD), and Rate of Droplets Having Diameters of 300 μm or Less The mean diameter of droplets generated through the spray nozzle during hydration according to Examples and Comparative Examples, and the rate of droplets having diameters of 300 μm or less in the droplets were measured by light diffraction analysis using droplet particle size analyzer (Sympatec HELOS/KR, manufactured by Sympatec GmbH). The rate of droplets having diameters of 300 μm or less was indicated as percentage based on the total weight of droplets generated (wt %).

(3) Moisture Content

The superabsorbent polymers obtained in Examples and Comparative Examples were classified on standard sieves of 850 μm (20 mesh), 600 μm (30 mesh), 300 μm (50 mesh), and 150 μm (100 mesh), and the moisture content of superabsorbent polymer particles having particle size of 150 to 850 μm was measured.

The moisture content is the content of moisture (wt % occupied based on the total weight of superabsorbent polymer, and it means a value obtained by subtracting the weight of superabsorbent polymer of a dry state from the weight of superabsorbent polymer. Specifically, it is defined as a value up such that the temperature is raised from room temperature to about 180° C. and then maintained at 180° C., and the total drying time is 20 minutes including a temperature raising step of 5 minutes.

(4) Content of Coarse Particles Greater than 850 μm

The superabsorbent polymer obtained in Examples and Comparative Examples were classified on standard sieves of 850 μm (20 mesh), 600 μm (30 mesh), 300 μm (50 mesh), and 150 μm (100 mesh), and the weight of coarse particles greater than 850 μm (20 mesh) was measured, and then, the content of the coarse particles was indicated as percentage based on the total weight of superabsorbent polymer (wt %).

(5) Degree of Pollution

The degree of pollution was calculated from the rate of superabsorbent polymer attached to a reactor.

Specifically, after hydration according to Examples and Comparative Examples, superabsorbent polymer (SAP) attached to the reactor outer wall and rotor was separated and the weight was measured, and then, the weight ratio of superabsorbent polymer attached to the reactor to the total weight of superabsorbent polymer was indicated as a percentage (wt %).

The properties measured by the above methods were respectively summarized in the following Table 3.

TABLE 3

| | Scattering index | Reynolds number of droplets | Reynolds number of air | SMD of droplets (μm) | Rate of droplets of 300 μm or less (wt %) | Moisture content (wt %) | Content of coarse particles greater than 850 μm(wt %) | Degree of pollution (wt %) |
|---|---|---|---|---|---|---|---|---|
| Example 1 | 8.47 | 0.26 | 3.07 | 471 | 8.4 | 2.4 | 1.7 | 1.4 |
| Example 2 | 8.79 | 0.27 | 3.07 | 550 | 5.6 | 2.3 | 1.6 | 1.7 |
| Example 3 | 7.82 | 0.24 | 3.07 | 530 | 6.5 | 1.8 | 2.4 | 1.6 |
| Comparative Example 1 | 48.21 | 1.48 | 3.07 | 775 | 1.7 | 9.4 | 7.2 | 8.7 |
| Comparative Example 2 | 59.61 | 1.83 | 3.07 | 3754 | 0.1 | 1.3 | 39.4 | 0.2 |
| Comparative Example 3 | 11.73 | 0.36 | 3.07 | 241 | 48.3 | 2.3 | 2.1 | 17.4 |
| Comparative Example 4 | 2.61 | 0.08 | 3.07 | 273 | 29.1 | 2.7 | 2.3 | 13.7 |
| Comparative Example 5 | 29.97 | 0.92 | 3.07 | 813 | 1.8 | 8.8 | 6.9 | 4.6 | calculated by measuring the weight loss according to moisture evaporation in the superabsorbent polymer while raising the temperature of the superabsorbent polymer through infrared heating to dry. Wherein, the drying condition is set As the result of experiments, in the case of Examples 1 to 3, moisture content was improved, and simultaneously, the content of coarse particles was significantly decreased, and the degree of reactor pollution was also low.

Meanwhile, in the case of Comparative Example 1 wherein hydration was conducted without pulse application using a normal type spray nozzle, due to excessive flow, it was difficult to apply a hydration process by spraying. As the result, the moisture content of prepared superabsorbent polymer excessively increased, and the content of coarse particles greater than 850 μm in the superabsorbent polymer also increased. Thus, it can be expected that the absorption power of superabsorbent polymer is deteriorated.

And, in the case of Comparative Example 2 wherein a hydration process was conducted by the same method as Comparative Example 1, except that water introduction flow was decreased to the level of Examples, due to low flow, it was difficult to spray, and the moisture content of prepared superabsorbent polymer was excessively low.

And, in the case of Comparative Example 3 wherein the orifice diameter during hydration was the smallest, a scattering index of droplets was the smallest, and thus, reactor pollution was most serious.

Meanwhile, in the case of Comparative Examples 4 and 5 wherein pulse spraying was conducted through a pulse type spray nozzle as in the present disclosure, but the spraying conditions were not fulfilled, a scattering index of droplets was excessively low or high, and thus, the degree of pollution significantly increased, or due to excessive increase in the moisture content in the superabsorbent polymer, the content of coarse particles significantly increased.

The invention claimed is:

1. A method for preparing superabsorbent polymer, comprising:
   polymerizing a monomer composition to form a hydrogel polymer, wherein the monomer composition comprises a water soluble ethylenically unsaturated monomer and a polymerization initiator, and wherein the polymerization is thermal polymerization or photopolymerization;
   drying and grinding the hydrogel polymer to prepare a base resin powder;
   surface cross-linking the base resin powder using a surface cross-linking agent to prepare surface cross-linked base resin powder; and
   hydrating the surface cross-linked base resin powder by pulse spraying water to prepare a superabsorbent polymer,
   wherein a scattering index of droplets generated during the pulse spraying is 5 to 10, and wherein the scattering index is calculated in accordance with the following Mathematical Formula 1:

Scattering index=[(Re droplet)/(Re air)]×100   [Mathematical Formula 1]

in the Mathematical Formula 1, Re droplet is Reynolds number of droplet, and Re air is Reynolds number of air.

2. The method for preparing superabsorbent polymer according to claim 1, wherein the pulse spraying comprises:
   pulse spraying from a pulse type spray nozzle, wherein a pulse controls a rate at which the pulse type spray nozzle is on or off.

3. The method for preparing superabsorbent polymer according to claim 2, wherein the orifice diameter of the pulse type spray nozzle is 1 to 2 mm.

4. The method for preparing superabsorbent polymer according to claim 1, wherein, during the pulse spraying, a pulse on rate is 10 to 50% of the total spraying time.

5. The method for preparing superabsorbent polymer according to claim 1, wherein, during the pulse spraying, a water introduction flow is 0.02 to 0.05 m³/hr.

6. The method for preparing superabsorbent polymer according to claim 1, wherein, during the pulse spraying, a pulse cycle is 1 to 2000 Hz.

7. The method for preparing superabsorbent polymer according to claim 1, wherein the average diameter of the droplets is 400 to 600 μm.

8. The method for preparing superabsorbent polymer according to claim 1, wherein an amount of droplets having diameters of 300 μm or less is 5 to 10 wt %, based on the total weight of generated droplets.

9. The method for preparing superabsorbent polymer according to claim 1, wherein the surface cross-linking agent comprises a polyhydric alcohol-based compound, an alkylene carbonate-based compound, and a multivalent metal salt.

10. The method for preparing superabsorbent polymer according to claim 9, wherein the polyhydric alcohol-based compound comprises ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropyleneglycol, or glycerol.

11. The method for preparing superabsorbent polymer according to claim 9, wherein the alkylene carbonate-based compound comprises ethylene carbonate or propylene carbonate.

12. The method for preparing superabsorbent polymer according to claim 10, wherein the multivalent metal salt comprises aluminum sulfate, aluminum carboxylate, or a mixture thereof.

13. The method for preparing superabsorbent polymer according to claim 9, wherein the surface cross-linking agent further comprises hydrophilic inorganic particles.

14. The method for preparing superabsorbent polymer according to claim 1, wherein the superabsorbent polymer has a moisture content of 1 to 5 wt %, and has a content of coarse particles having particle size greater than 850 μm of 5 wt % or less, based on the total weight of the superabsorbent polymer.

* * * * *